United States Patent
Kalhan et al.

(10) Patent No.: US 10,194,452 B2
(45) Date of Patent: Jan. 29, 2019

(54) DEVICE-TO-DEVICE (D2D) CHANNEL MANAGEMENT WITH NETWORK-ASSISTED REFERENCE SIGNAL TRANSMISSION

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 8 days.

(21) Appl. No.: 15/329,915

(22) PCT Filed: Aug. 6, 2015

(86) PCT No.: PCT/US2015/044075
§ 371 (c)(1),
(2) Date: Jan. 27, 2017

(87) PCT Pub. No.: WO2016/022841
PCT Pub. Date: Feb. 11, 2016

(65) Prior Publication Data
US 2017/0251485 A1    Aug. 31, 2017

Related U.S. Application Data

(60) Provisional application No. 62/034,951, filed on Aug. 8, 2014.

(51) Int. Cl.
*H04W 72/08* (2009.01)
*H04W 76/14* (2018.01)
*H04L 5/00* (2006.01)

(52) U.S. Cl.
CPC ......... *H04W 72/087* (2013.01); *H04L 5/0048* (2013.01); *H04W 72/08* (2013.01); *H04W 76/14* (2018.02)

(58) Field of Classification Search
CPC ... H04W 72/087; H04W 76/14; H04W 72/08; H04L 5/0048
See application file for complete search history.

(56) References Cited

U.S. PATENT DOCUMENTS

2014/0010172 A1    1/2014    Wei et al.
2015/0296443 A1*   10/2015   Lim .................. H04W 48/12
                                                            370/312

FOREIGN PATENT DOCUMENTS

WO    WO2013074463 A1    5/2013
WO    WO2013078946 A1    6/2013
(Continued)

OTHER PUBLICATIONS

Qualcomm Incorporated; "Reference Signal Design for D2D," R1-141963, 3GPP TSG-RAN WG1 #77; May 10, 2014; Seoul, South Korea.

*Primary Examiner* — Omar J Ghowrwal (57) ABSTRACT

A base station (eNB) determines device-to-device (D2D) transmission parameters for signal transmission over a D2D communication link between a first user equipment (UE) device and a second UE device. The eNB instructs the first UE device to transmit a reference signal that is received by the second UE device. The second UE device reports D2D channel characteristic information indicative of the received reference signal. Based on the D2D channel characteristic information, the base station determines the D2D transmission parameters and provides the parameters to the first UE device.

20 Claims, 10 Drawing Sheets

(56) References Cited

FOREIGN PATENT DOCUMENTS

| WO | WO 2013/100831 A1 | 7/2013 |
| WO | WO2014015101 A1 | 1/2014 |

\* cited by examiner

DEVICE-TO-DEVICE (D2D) CHANNEL MANAGEMENT WITH NETWORK-ASSISTED REFERENCE SIGNAL TRANSMISSION

CLAIM OF PRIORITY

The present application claims priority to Provisional Application No. 62/034,951 entitled "Network-Assisted D2D Transmit UE Reference Signal", filed Aug. 8, 2014, assigned to the assignee hereof and hereby expressly incorporated by reference in its entirety.

FIELD

This invention generally relates to wireless communications and more particularly to device-to-device (D2D) channel management with network-assisted reference signal transmission.

BACKGROUND

Many wireless communication systems use base stations to provide geographical service areas where wireless communication user equipment (UE) devices communicate with the base station (evolved Node B, eNB) providing the particular geographical service area in which the wireless communication UE devices are located. The base stations are connected within a network allowing communication links to be made between the wireless communication devices and other devices. In some situations, the communication links may be between UE devices within the service area of a base station. A cellular communication link between the UE devices includes communication through the base station providing the service. Where channel quality is sufficient, the UE devices can communicate directly through a device-to-device (D2D) communication link that does not include routing data through the base station. Some situations, it may be preferred to have a direct D2D communication link between the two UE devices rather than communicating through a base station.

SUMMARY

A base station (eNB) determines device-to-device (D2D) transmission parameters for signal transmission over a D2D communication link between a first user equipment (UE) device and a second UE device. The eNB instructs the first UE device to transmit a reference signal that is received by the second UE device. The second UE device reports D2D channel characteristic information indicative of the received reference signal. Based on the D2D channel characteristic information, the base station determines the D2D transmission parameters and provides the parameters to the first UE device.

DETAILED DESCRIPTION

Figure 1A:
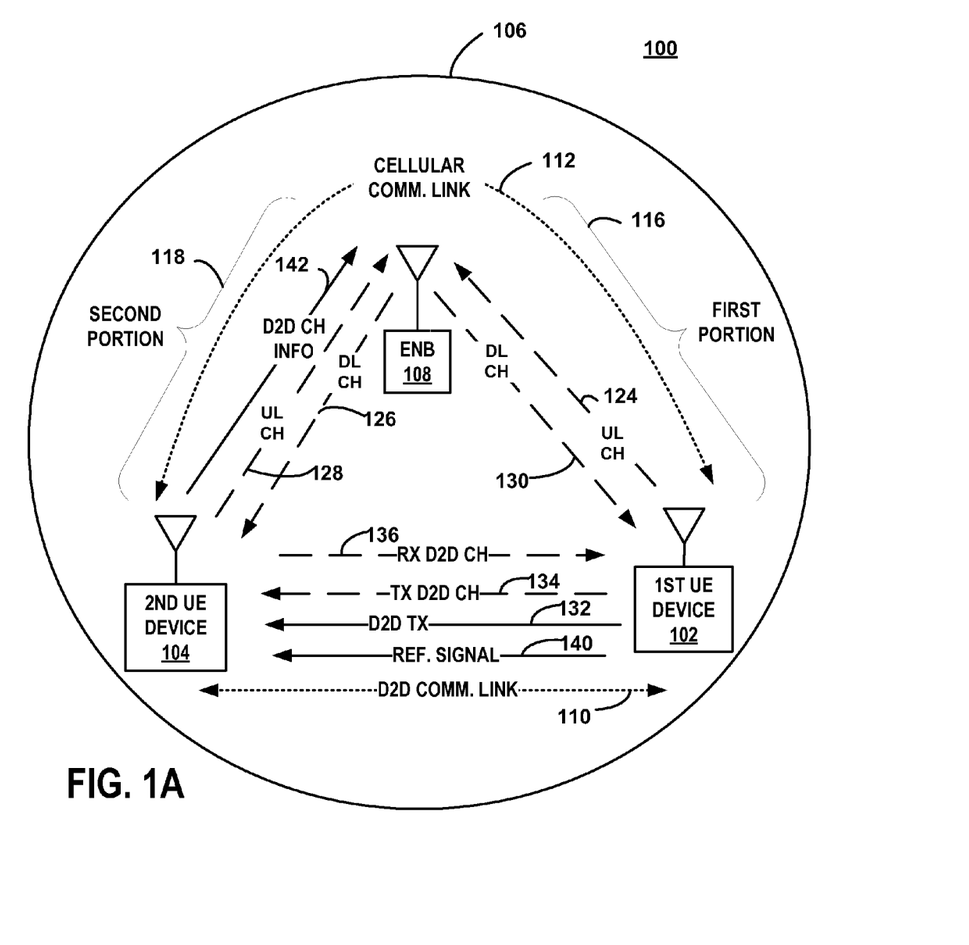
FIG. 1A is a block diagram of cellular communication system that supports device-to-device (D2D) communication where a base station (eNB) determines D2D transmission parameters for D2D communication between a first user equipment (UE) device and a second UE device based on D2D channel characteristic information determined from a reference signal received at the second UE device.

FIG. 1A is a block diagram of cellular communication system 100 that supports device-to-device (D2D) communication where a base station (eNB) determines D2D transmission parameters for D2D communication between a first user equipment (UE) device 102 and a second UE device 104 based on D2D channel characteristic information determined from a reference signal received at the second UE device. For the example, each of the two UE devices 102, 104 a can be a transmitting device and a receiving device although in some situations, a device may only be a receiving or transmitting device. For the example of FIG. 1A and FIG. 1B, the first UE device 102 and the second UE device 104 are within the geographic service area 106 provided by a base station (eNB) 108 and are capable of communicating over a D2D link. Even when the channel conditions may be adequate for supporting D2D communication, D2D may not be the preferred link. A D2D communication link 110, as well as a cellular communication link 112, can be established for transmission of data between the first UE device 102 and the second UE device 104. The D2D communication link 110 is a direct wireless communication link between the first UE device 102 and the second UE device 104 that does not route data through the base station (eNB) 108. The cellular communication link 112 includes at least a first portion 116 from the first UE device 102 to the base station (eNB) 108 and a second portion 118 from the base station (eNB) 108 to the second UE device 104. Therefore, sending data from the first UE device 102 to the second UE device 104 includes an uplink transmission to the eNB and a downlink transmission from the eNB to the second UE device. Uplink transmissions are transmitted in the first portion 116 over one or more uplink channels 124. The base station 108 transmits the downlink transmissions to the second UE device 102 over one or more downlink channels 126. The base station 108 can also transmit downlink signals to the first UE device 102 over downlink channels 128 and receive uplink signals from the second UE device over uplink channels 130. Accordingly, for the example, the cellular communication link is bidirectional.

Sending the data from the first UE device 102 to the second UE device 104 over the D2D communication link 110 includes a D2D transmission 132 over one or more D2D transmission channels 134. The first UE device can also receive signals from the second UE device 104 over D2D reception channels 136. One or more of the D2D transmission channels 134 can be the same as the D2D reception channels 136. For the examples herein, the D2D channels 134, 136 are a subset of cellular uplink channels. In some cases, downlink channels can be used.

The base station (eNB) 108 provides wireless communication services to wireless communication user equipment (UE) devices 102, 104 within the geographical service area 106, sometimes referred to as a cell. Several base stations are typically interconnected through a backhaul (not shown) to provide several service areas to cover large areas. Other system components forming system entities and performing system functions such as Mobility Management Entity (MME), scheduling, gateway and other functions are omitted from FIG. 1 in the interest of brevity and clarity. Any description with reference FIG. 1 of the various functions and operations of such equipment may be implemented in any number of devices, circuits, or elements. Two or more functional blocks may be integrated in a single device, and the functions described as performed in any single device may be implemented over several devices in some circumstances. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with at least one revision of the 3GPP LTE communication specification.

The base station (eNB) 108 is a fixed transceiver station, sometimes referred to as an evolved Node B, eNodeB or eNB, which may include a controller in some circumstances. The base station 108 may be connected to a controller through a backhaul which may include any combination of wired, optical, and/or wireless communication channels. The controller may include the functionality of the Mobility Management Entity (MME) and the Packet Gateway (P-GW) in a 3GPP LTE communication system.

The wireless (UE) communication devices (UE devices) 102, 104 may be referred to as mobile devices, wireless devices, wireless communication devices, mobile wireless devices, user equipment, UEs, UE devices as well as by other terms. The UE devices 102, 104 include electronics and code for communicating with base stations and with other wireless communication devices in D2D configurations. The UE devices may include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a UE device 102, 104. For example, a UE device may include a wireless modem connected to an appliance, computer, or television.

The base station 108 includes a wireless transceiver that exchanges wireless signals with the UE devices 102, 104. Transmissions from the base stations and from the UE devices 102, 104 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device.

As discussed below in further detail, the eNB 108 instructs the first UE device 102 to transmit a reference signal. The first UE device transmits the reference signal 140 which is received by the second UE device 104. Based on the received reference signal, the second UE device 104 determines and transmits D2D channel characteristics information 142 to the eNB 108. Based on the D2D channel characteristics information 142, the eNB determines the D2D transmission parameters that should be used by the first UE device 102 for D2D transmission 132 to the second UE device 104.

Figure 1B:
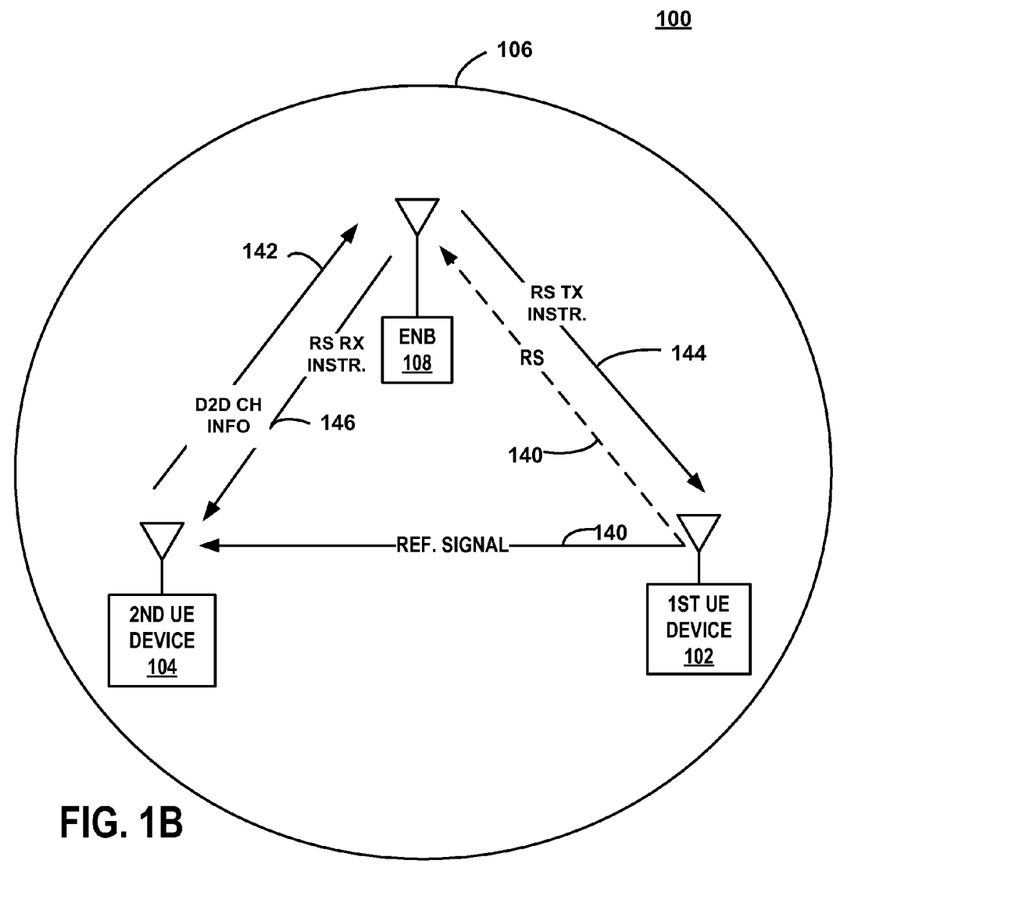
FIG. 1B is a block diagram of the communication system where the eNB instructs the first UE device to transmit a reference signal and the second UE device reports D2D channel characteristic information based on the received reference signal.

FIG. 1B is a block diagram of the communication system 100 where the eNB 108 instructs the first UE device 102 to transmit a reference signal 140 and the second UE device reports D2D channel characteristic information 142 based on the received reference signal. The eNB 108 sends a reference signal transmission instruction 144 to the first UE device 102 instructing the UE device to transmit a reference signal 140. The instruction 144 identifies the communication resources that should be used by the first UE device 102 to transmit the reference signal 140. For the example, the instruction 144 is transmitted on a downlink channel such as the PDCCH/PDSCH or higher layer signaling. In some situations, the reference signal transmission instruction 144 can be broadcast over a System Information Block (SIB). Such as technique may be useful when a set of D2D UE devices are instructed at the same time. Other channels can be used to transmit the reference signal transmission instruction 144.

The reference signal transmission instruction 144 specifically identifies the resources that the UE device should use for transmitting the reference signal in some situations. In other situations, the reference signal transmission instruction 144 can identify a set of resources that the UE device may use for reference signal transmission and the UE device is instructed to autonomously select communication resources from the set to transmit a reference signal when the UE device is interested in D2D communication. For the examples, the reference signal transmission instruction 144 identifies the frequency/time communication resources for reference signal transmission and the power level for transmitting the reference signal. The power level may be based on the closed loop power control between the eNB and the first UE device. A fixed known transmission power level known to the eNB is used for the reference signal. In one example, the eNB can provide this parameter in the SIB messaging to all the UE devices. In another example, the eNB can indicate the transmission power level to the first UE device based on the received uplink power level.

The reference signal 140 is transmitted on the carrier that will be used for D2D communication. For the example, therefore, the reference signal 140 is transmitted on the uplink carrier that is allocated for D2D communication.

As discussed below with reference to FIG. 1C, the reference signal 140 may be received by the eNB in some situations. As discussed below, the eNB can instructs multiple UE devices to transmit the reference signal at the same frequency and time to determine the level of interference due to other UE devices. Such a technique is optional and may not be performed every time the D2D channel characteristic is reported, however. As a result, a dashed line represents the reference signal received by the eNB 108 in FIG. 1B.

The eNB 108 also transmits a reference signal reception instruction 146 to the second UE device 104 (target UE device) where the instruction 146 indicates the communication resources that will be used to transmit the reference signal 140 from the first UE device. For the example, the instruction 144 is transmitted in a downlink channel such as the PDCCH/PDSCH and/or higher layer signaling. Other channels can be used. In some situations, the reference signal reception instruction 146 identifies the set of resources that may be used for reference signal transmission. For example, the reference signal reception instruction 146 can be sent via SIB messaging. Therefore, the second UE device may report the D2D channel characteristics when the first UE device autonomously selects communication resources and transmits a reference signal that is received by the second UE device. The instruction 146 also identifies communication resources that should be used by the second UE device to transmit D2D channel characteristic information to the eNB 108. In some situations, the communication resources for reporting the channel information may be provided by the eNB in a separate message. The second UE device 104 receives the reference signal 140 and determines the D2D channel characteristic information that is then reported to the eNB 108.

The D2D channel characteristic information 142 determined by the second UE device 104 may include various types of information and formats. The second UE device 104 measures, or otherwise evaluates, the reference signal 140 transmitted from the transmitting UE device over the D2D transmission channel 134. For the example, the technique for measuring evaluating the reference signal (D2D transmission channel) is similar to conventional techniques used in 3GPP LTE systems for determining uplink channel state information (CSI) by eNBs for the uplink channels. The actual D2D CSI parameters may be sent to the eNB 108 as the D2D channel characteristic information 142. In some situations, however, the D2D channel characteristic information 142 sent to the eNB 108 may be information based on the CSI parameters. For example, the information may be derived from the CSI parameters and not the actual CSI parameters. For the example, therefore, the D2D channel characteristic information 142 is at least indicative of the CSI parameters measured by the second UE device. Although the second UE device may report the D2D channel characteristic information after receiving a single reference signal, the UE device reports information based on multiple reference signals received over time in the example. For the example, therefore, multiple reference signals are received and processed to determine the CSI parameters. Techniques such as time averaging and filtering can be used to process the measurements and generate the CSI reports.

Figure 1C:
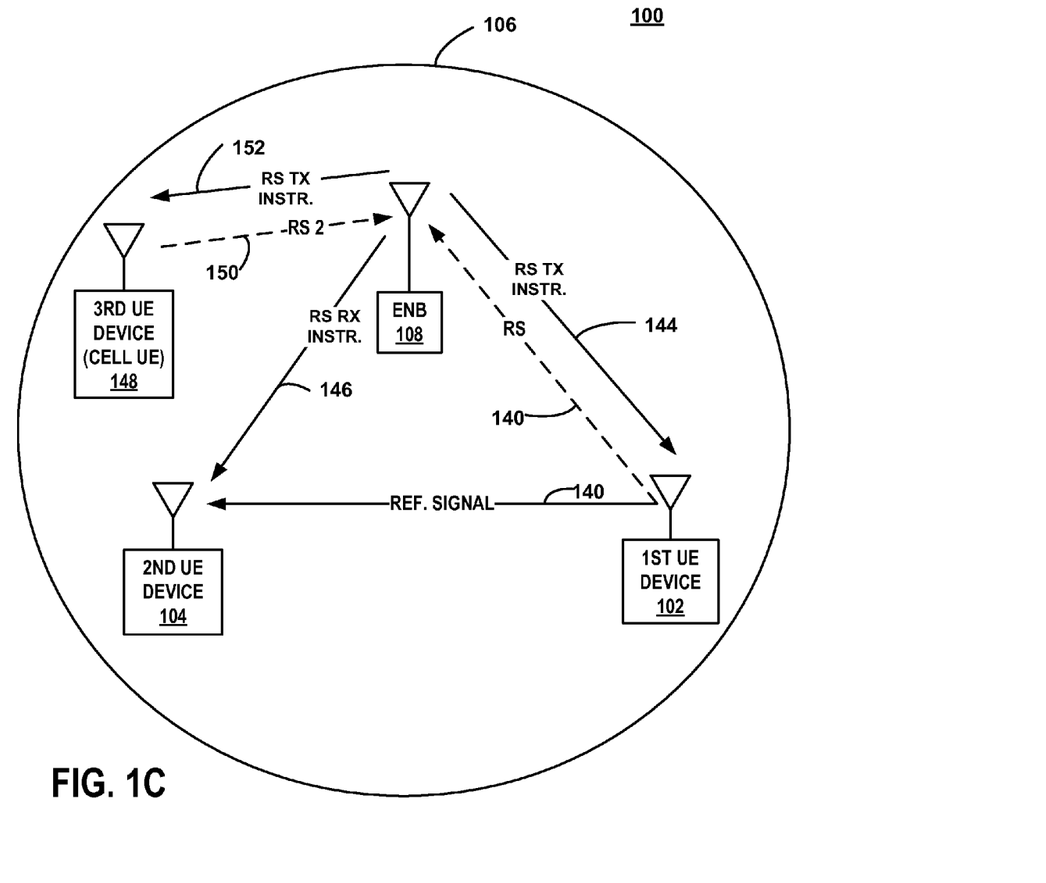
FIG. 1C is a block diagram of the communication system where the eNB instructs the first UE device and a third UE device to transmit reference signals at the same time and frequency to determine a level of interference.

FIG. 1C is a block diagram of the communication system 100 where the eNB 108 instructs the first UE device 102 and a third UE device 148 to transmit reference signals 140, 150 at the same time and frequency to determine a level of interference. For the example in FIG. 1C, the third UE device 148 is a cellular UE device that is, or will be, communicating using cellular communication links and not D2D communication links. The eNB 108 instructs the third UE device 148 to transmit the reference signal 150 by sending a reference signal transmission instruction 152 to the third UE device 148. The instruction 152 provides reference signal transmission parameters that result in transmission of the reference 150 signal at the same time and frequency as the reference signal 140 transmitted from the first UE device. Under certain conditions, the reference signal 140 will cause interference with the reference signal 150. The eNB receives both reference signals 140, 150 and determines if the level of interference is tolerable (e.g., below a threshold). The eNB takes into account the interference level when determining the D2D transmission parameters. For example, if the interference cannot be tolerated, the time/frequency communication resources are not reused. In other words, the same communication resources are not assigned to different UE devices where interference of their reference signals is above a threshold.

Figure 1D:
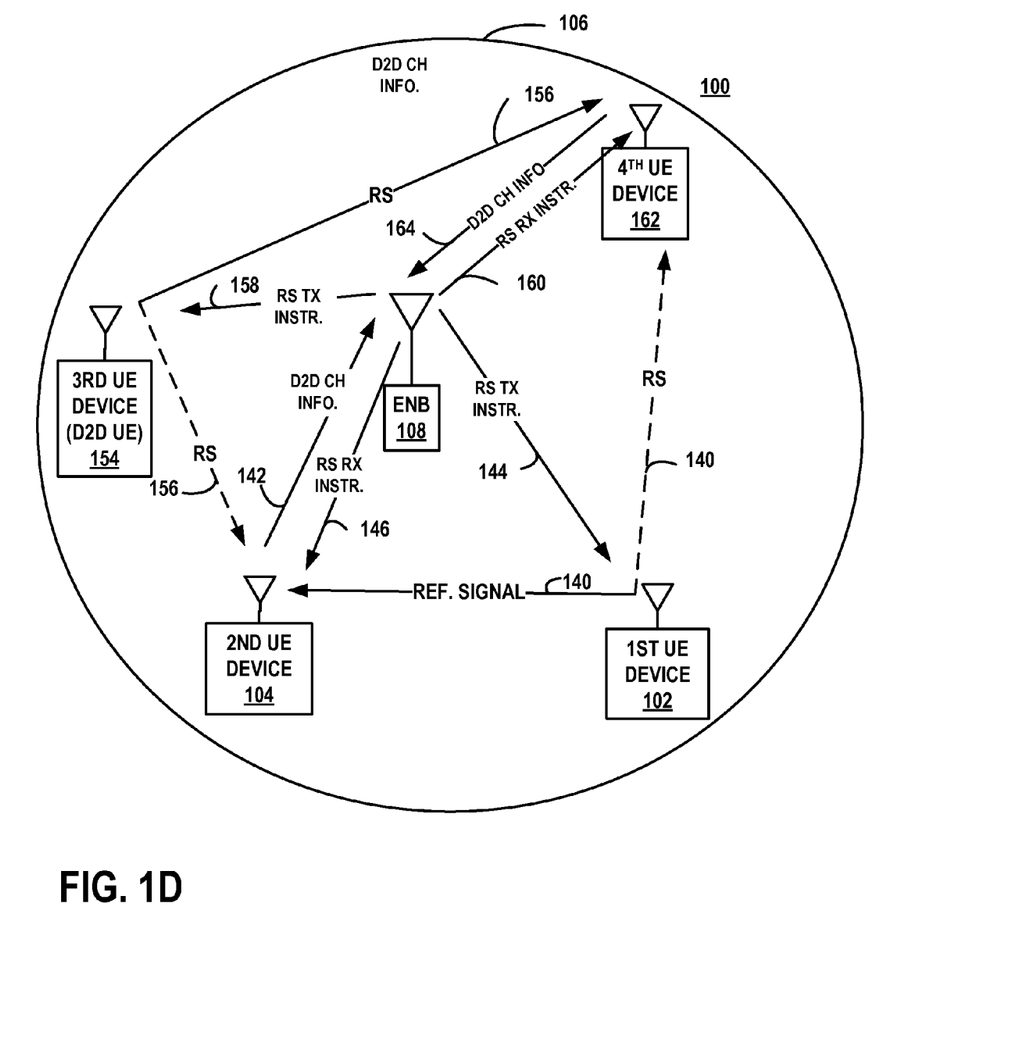
FIG. 1D is a block diagram of the communication system where the eNB instructs the first UE device and a third UE device to transmit reference signals at the same time and frequency to determine a level of interference with other D2D devices.

FIG. 1D is a block diagram of the communication system 100 where the eNB 108 instructs the first UE device 102 and a third UE device 154 to transmit reference signals 140, 156 at the same time and frequency to determine a level of interference with other D2D devices. When multiple pairs of D2D UE devices are communicating in proximity to each other, it is possible that their transmissions will cause interference when the same communication resources are being used. On the other hand, the objective to efficiently use communication resources requires that the communication be reused when possible. For the example of FIG. 1D, reference signal are used to determine whether communication resources can be reused for D2D communication between different sets of D2D UE devices. For the example of FIG. 1D, the third UE device 154 is a D2D UE device that is using, or has requested to use, D2D communication resources. The eNB 108 instructs the third UE device 154 to transmit the reference signal 156 by sending a reference signal transmission instruction 158 to the third UE device 154. The instruction 158 provides reference signal transmission parameters that result in transmission of the reference 156 signal at the same time and frequency as the reference signal 140 transmitted from the first UE device. Under certain conditions, the reference signal 140 will cause interference with the reference signal 156 at other UE devices and/or the reference signal 156 will cause interference with the reference signal 140. The eNB sends a reference signal reception instruction 160 to a fourth UE device 162 inform the fourth UE device of the transmission of the reference signal 156 and to provide information to assist the UE device in receiving the reference signal 156. The second UE device 104 determines the level of interference caused by the second reference signal 156 to the first reference signal 140 and reports the interference to the eNB. The fourth UE device 162 determines the level of interference caused by the first reference signal 140 to the second reference signal 156 and reports the interference to the eNB. The interference information that is reported may include any type of parameters that indicate the level of interference. Examples of suitable interference parameters include the power levels of the reference signals and power ratios of the power levels such as signal to-noise-ratio (SNR), signal-to-interferenceplus-noise ratio (SINR) (also known as the signal-to-noise-plus-interference ratio (SNIR)) or combinations thereof. The interference information may be reported as part of the D2D channel characteristic information 164 from the $4^{th}$ UE device or may be transmitted separately. The interference information determined by the second UE device may be transmitted in the D2D channel characteristic information 142.

Based on the interference information, the eNB determines whether the same communication resources can be assigned to different sets of D2D UE devices. If the interference is below a threshold, the eNB reuses the communication resources.

Figure 2:
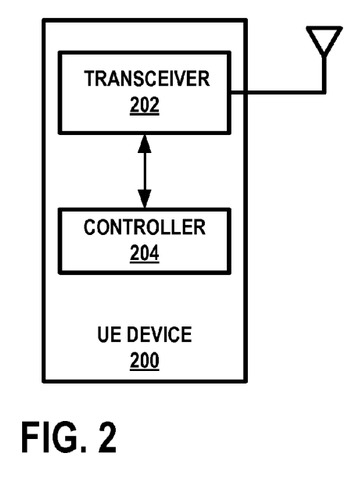
FIG. 2 is a block diagram of an example of a UE device suitable for use as one of the UE devices.

FIG. 2 is a block diagram of an example of a UE device 200 suitable for use as one of the UE devices 102, 104, 148, 154, 162. The UE device 200 includes a transceiver 202 and a controller 204, as well as other components and circuitry (not shown) such as memory and a user interface, for example.

The transceiver 202 includes a transmitter that transmits uplink wireless signals to base stations (eNBs) and a receiver that receives downlink wireless signals from base stations (eNBs) over the uplink and downlink channels, respectively. The transceiver 202 is also configured to transmit and receive D2D signals using allocated cellular resources, such as uplink communication resources, for example. The controller 204 controls components of the UE device 200 to manage the functions of the device 200 described herein as well as to facilitate the overall functionality of the device 200. The controller 204 is connected to the transceiver 202 and other components such as memory.

The receiver in the transceiver 202 may also be used to measure parameters to determine channel characteristics for the downlink channel and the D2D channels. The controller and the receiver measure one or more parameters that indicate channel characteristic information such as the quality of the channel, required transmission power for transmission through the channel, or power levels related to the received reference signal such as total received power, signal to-noise-ratio (SNR), signal-to-interference-plus-noise ratio (SINR) (also known as the signal-to-noise-plus-interference ratio (SNIR)) or combinations thereof. The controller 204 in the UE device 200 determines the CSI parameters based on the measured channel parameters and generates CSI reports that are sent to the eNB.

Figure 3:
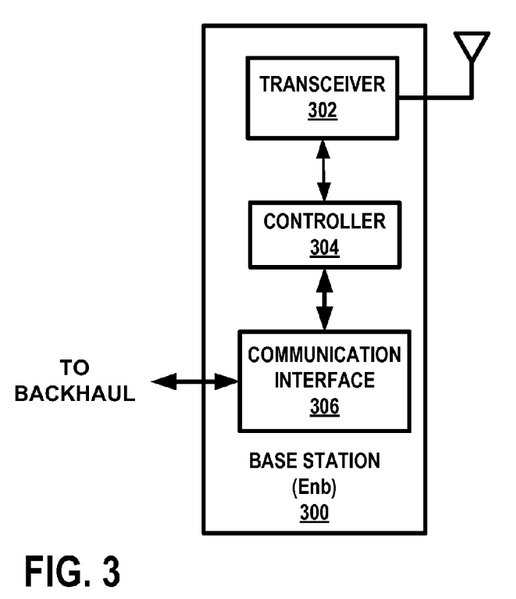
FIG. 3 is a block diagram of an example of a base station (eNB) suitable for use as the base station (eNB) in FIG. 1.

FIG. 3 is a block diagram of an example of a base station (eNB) 300 suitable for use as the base station (eNB) 108 in FIG. 1. The base station (eNB) 300 includes a transceiver 302, a controller 304, and a communication interface 306 as well as other components and circuitry (not shown) such as memory, for example.

The transceiver 302 exchanges wireless signals with the UE devices 104, 106 within the service area 106. Transmissions from the base station (eNB) and from the UE devices are governed by a communication specification that defines signaling, protocols, and parameters of the transmission. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels.

The transceiver 302, therefore, includes at least a downlink transmitter for transmitting downlink signals and an uplink receiver for receiving uplink signals. The receiver and controller measure one or more parameters to determine characteristics of the uplink channels. The receiver, therefore, is capable of measuring the reference signal transmitted by the UE devices to determines cellular channel characteristic information such as the quality of the cellular channel, required transmission power for transmission through the channel, and/or power levels related to the received reference signal such as total received power, signal to-noise-ratio (SNR), signal-to-interference-plus-noise ratio (SINR) (also known as the signal-to-noise-plus-interference ratio (SNIR)) or combinations thereof.

For the example, the base station (eNB) 300 also includes a communication interface 306 for facilitating communication over the backhaul with other eNBs and network entities. Where X2 signaling is available, the communication interface 312 communicates over the backhaul using X2.

In addition to other functions, the controller evaluates the channel characteristic information to allocate and assign communication resources to UE devices including D2D UE devices and cellular UE devices. The examples discussed with reference to FIG. 1A, FIG. 1B, FIG. 1C and FIG. 1D may be performed independently or collectively. For example, the eNB may determine only D2D transmission parameters for a set of D2D UE devices in one situation. In other situations, the eNB may determine the D2D transmission parameters for multiple sets of D2D UE devices and allocate communication resources for D2D and cellular communication.

Figure 4:
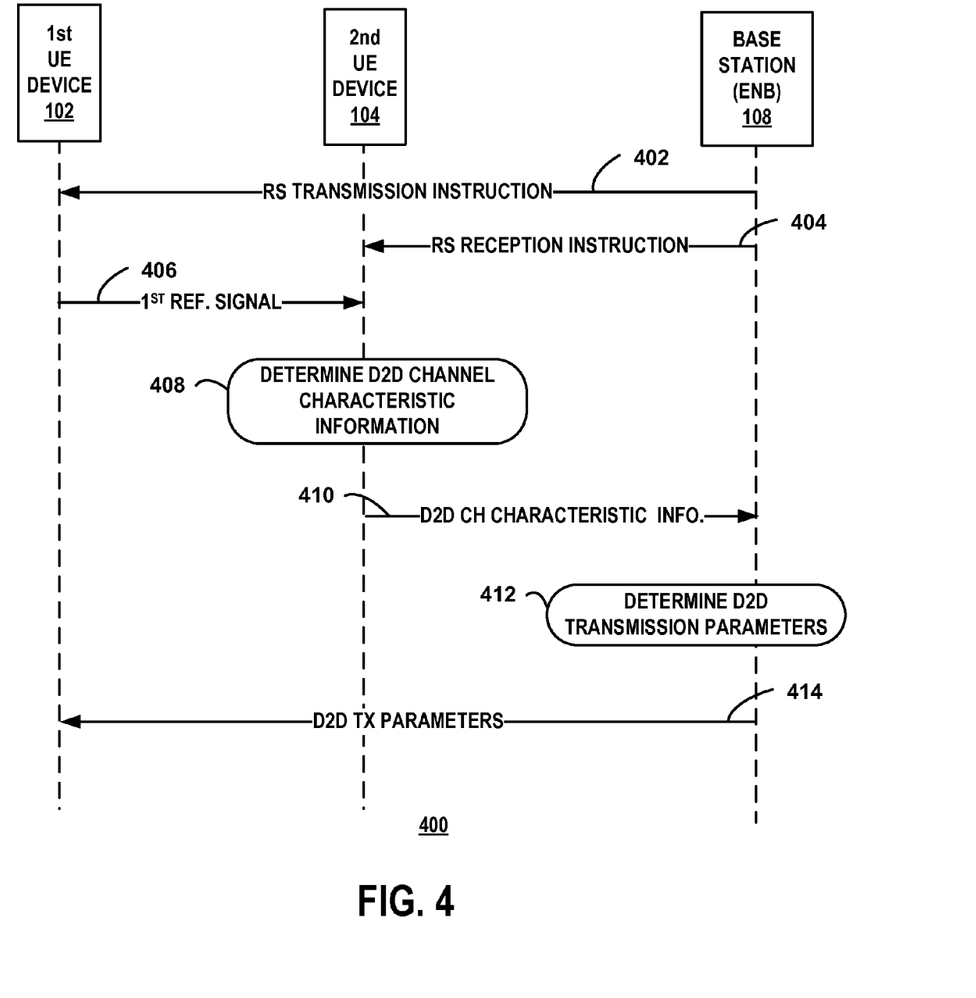
FIG. 4 is a message diagram for an example of determining D2D transmission parameters based on network-assigned reference signal transmissions.

FIG. 4 is a message diagram 400 for an example of determining D2D transmission parameters based on network-assigned reference signal transmissions. The message transmission discussed with reference to FIG. 4, therefore, provide an example of message transmission suitable for the examples discussed with reference to FIG. 1A and FIG. 1B.

At transmission 402, the eNB 108 transmits a reference signal transmission instruction 144 to the first UE device where the instruction identifies the communication resources that should be used by the first UE device to transmit a reference signal 140. For the example, the instruction 144 is transmitted in the PDCCH/PDSCH although other channels can be used.

At transmission 404, the eNB 108 transmits a reference signal reception instruction 146 to the second UE device where the instruction 146 identifies the communication resources that will be used by the first UE device to transmit the reference signal 140. For the example, the instruction 146 is transmitted in the PDCCH/PDSCH although other channels can be used. In some situations, the reference signal reception instruction 146 identifies communication resources that should be used by the second UE device to report the D2D channel characteristics to the eNB.

The first reference signal is transmitted by the first UE device 102 and received by the second UE device at transmission 406.

At event 408, the second UE device 104 determines the D2D channel characteristics D2D communication link 110. For the example, the second UE device 104 received and evaluates toe reference signal to determine CSI parameters.

At transmission 410, the second UE device sends the D2D channel characteristic information to the eNB 108. For the example, the second UE device 104 sends a message indicative of the CSI parameters over the communication resources identified by the eNB 108. Such communication resources may include resources in the PUCCH/PUSCH, for example.

At event 412, the eNB determines the D2D transmission parameters for transmitting D2D signals from the first UE device 102 to the second UE device 104. Based on the CSI parameters for the D2D channel, the eNB determines the appropriate transmission parameters that may include any combination of coding, modulation, transmission power, time/frequency resources and MIMO parameters. Other parameters may be included.

At transmission 414, the eNB 108 transmits the D2D transmission parameters to the first UE device 102. A suitable technique includes sending the parameters over the PDCCH/PDSCH.

Figure 5:
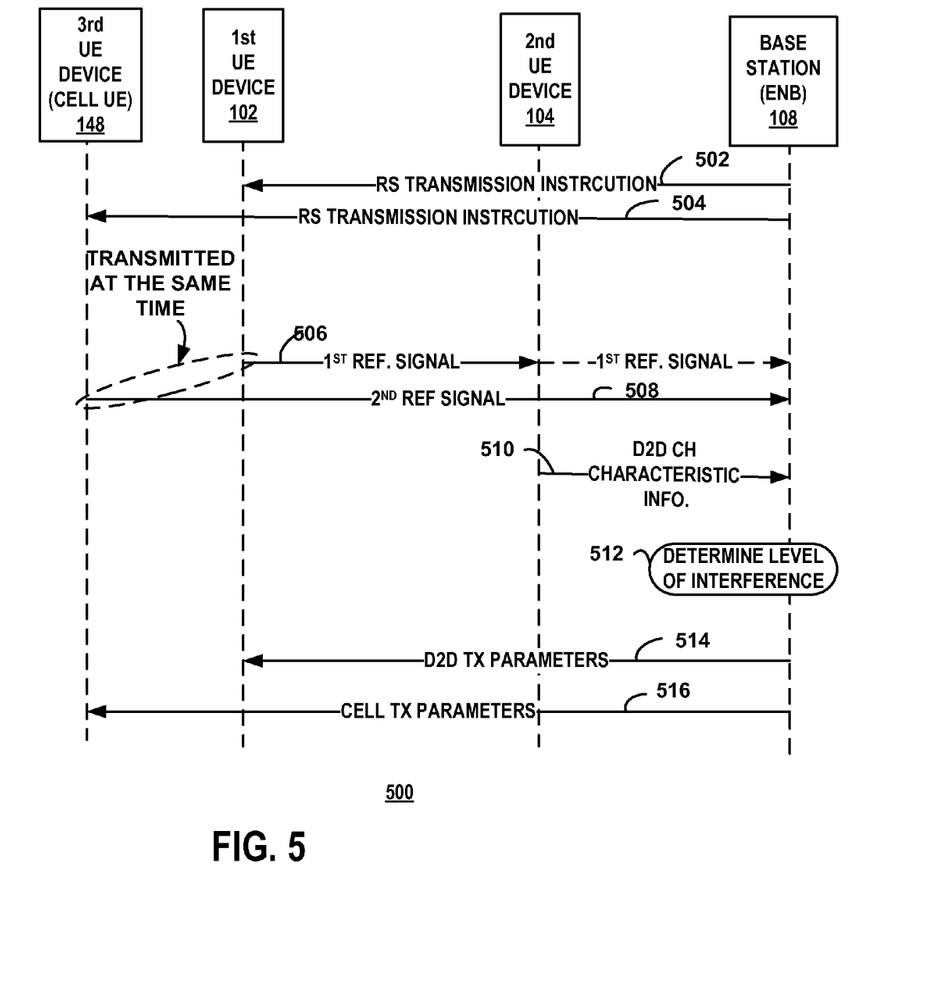
FIG. 5 is a message diagram for an example of determining a level of interference at the eNB 108 based on network-assigned reference signal transmissions.

FIG. 5 is a message diagram 500 for an example of determining a level of interference at the eNB 108 based on network-assigned reference signal transmissions. The message transmission discussed with reference to FIG. 5, therefore, provides an example of message transmission suitable for the examples discussed with reference to FIG. 1A and FIG. 1C. For the example, the third UE device 148 is a cellular UE device that is, or will be communicating, using cellular communication. In the interest of brevity and clarity, some transmissions discussed with reference to other figures are not shown in FIG. 5.

At transmission 502, the eNB 108 transmits a reference signal transmission instruction 144 to the first UE device 102 where the instruction 144 identifies the communication resources that should be used by the first UE device 102 to transmit a first reference signal 140. For the example, the instruction 144 is transmitted in the PDCCH/PDSCH although other channels can be used.

At transmission 504, the eNB 108 transmits a reference signal transmission instruction 152 to the third UE device 148 where the instruction identifies the communication resources that should be used by the third UE device 148 to transmit a second reference signal 150. For the example, the instruction 152 is transmitted in the PDCCH/PDSCH although other channels can be used.

The first reference signal 140 is transmitted by the first UE device 102 and received by the second UE device at transmission 506. The second reference signal 150 is transmitted from the third UE device 148 at the same time as the first reference signal 140 is transmitted from the first UE device 102. In the interest of clarity, FIG. 5 does not show the two transmissions 506, 508 at the same location (frequency resource) within the message diagram. Therefore, although FIG. 5 shows the transmission 508 below the transmission 506, the two transmissions 506, 508 are occurring at the same time. The first reference signal is received at the second UE device and possibly received at the eNB. The second reference signal 150 is received at the eNB.

As discussed above, the second UE device 104 determines the D2D channel characteristic information. The D2D channel characteristic information such CSI parameters are reported to the eNB at transmission 510.

At event 512, the eNB determines the level of interference to the second reference signal 150 caused by the first reference signal 140 at the eNB. Examples of suitable techniques of determining the level of interference include measuring total power of the first reference signal or determining power ratios of the reference signals 140, 150. Based on the interference level, the eNB determines whether the communication resources assigned to the first UE device for D2D communication can be assigned to the third UE device 148.

At transmission 514, the eNB 108 transmits the D2D transmission parameters to the first UE device 102. At transmission 516, eNB 108 transmits the cellular transmission parameters 516 to the third UE device 102 where the assigned communication resources are based on the level of interference. If level of interference is sufficiently low, the same communication resources are reused and assigned to the first UE device and the third UE device.

Figure 6:
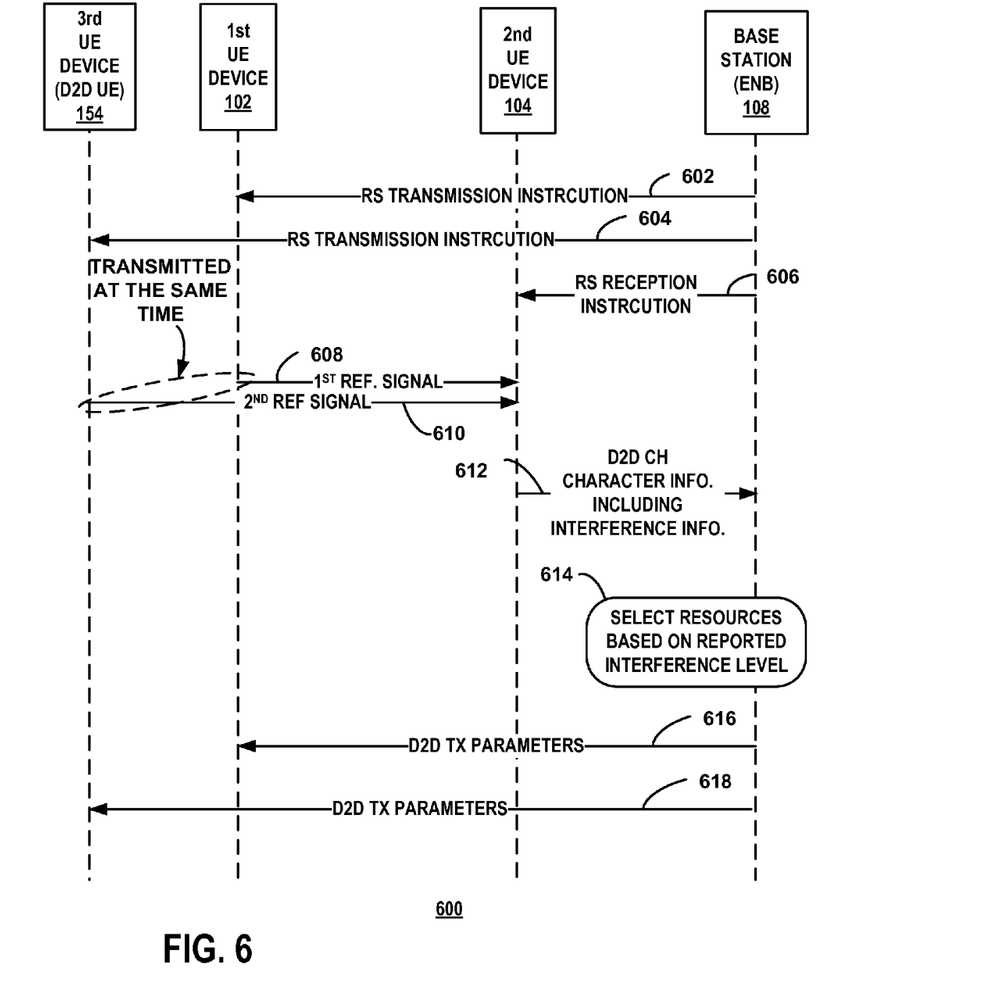
FIG. 6 is a message diagram for an example of determining a level of interference at D2D UE devices based on network-assigned reference signal transmissions.

FIG. 6 is a message diagram 600 for an example of determining a level of interference at D2D UE devices based on network-assigned reference signal transmissions. The message transmission discussed with reference to FIG. 6, therefore, provides an example of message transmission suitable for the examples discussed with reference to FIG. 1A and FIG. 1D. For the example, the third UE device 148 is a D2D UE device that is communicating or is requesting to communicate, using D2D communication. In the interest of brevity and clarity, some transmissions discussed with reference to other figures and they may occur in some circumstances are not shown in FIG. 6. For example, communications with a fourth UE device are omitted in FIG. 6.

At transmission 602, the eNB transmits a reference signal transmission instruction 144 to the first UE device 102 instructing the first UE device to transmit a reference signal. For the example, the instruction is transmitted over the PDCCH/PDSCH channel although other channels may be used.

At transmission 604, the eNB transmits a reference signal transmission instruction 158 to the third UE device 154 instructing the third UE device to transmit a reference signal. For the example, the instruction is transmitted over the PDCCH/PDSCH channel although other channels may be used.

At transmission 606, the eNB transmits a reference signal reception instruction 146 to the second UE device 104 providing the second UE device 104 with information that assists the second UE device in receiving the reference signal 140. For the example, the instruction is transmitted over the PDCCH/PDSCH channel although other channels may be used.

At transmission 608 and transmission 810, two UE devices transmit a reference signal at the same time and at the same frequency. The first UE device 102 transmits the first reference signal. The third UE device 154 transmits another reference signal 156 at the same time and at the same frequency as the first reference signal 140.

At transmission 612, the second UE device transits D2D channel characteristic information that includes interference information regarding the level of interference to the first reference signal 140 caused by the other reference signal 156 at the second UE device. Examples of suitable techniques of determining the level of interference include measuring total power of the first reference signal or determining power ratios of the reference signals.

At event 614, the eNB selects the communication resources based on the reported interference levels. Based on the interference level, the eNB determines whether the communication resources assigned to the first UE device for D2D communication can be assigned to the third UE device 148.

At transmission 616, the eNB 108 transmits the D2D transmission parameters to the first UE device 102. At transmission 616, eNB 108 transmits the D2D transmission parameters to the third UE device 102 where the assigned communication resources are based on the level of interference. If the level of interference is sufficiently low, the same communication resources are reused and assigned to the first UE device and the third UE device.

Figure 7:
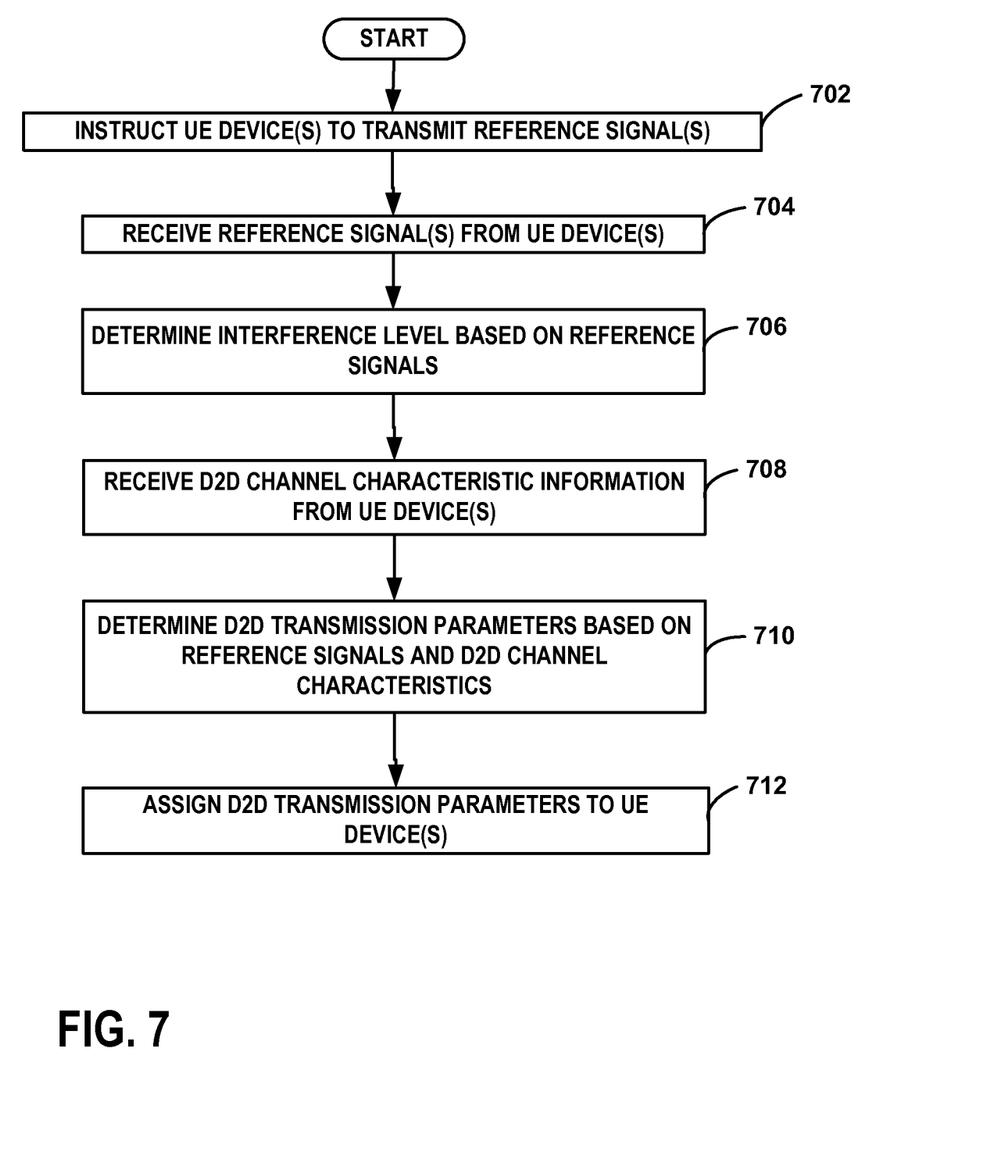
FIG. 7 is a flowchart of an example of a method of managing communication using network-assisted reference signal transmission performed at an eNB.

FIG. 7 is a flowchart of an example of a method of managing communication using network-assisted reference signal transmission performed at an eNB 108. For the examples herein, the method is performed by executing code on the controller and utilizing other components of the eNB 108. The steps of the method may be performed in a different order and some steps may be performed simultaneously in some situations. For example, reference signal transmission instructions can be sent to multiple UE devices at the same time. As discussed above, the various examples discussed above may be performed individually or collectively. Therefore, some steps in FIG. 7 may be omitted in some situations. For example, in some situations, interference levels are not determined and step 706 is omitted.

At step 702, the eNB instructs one or more UE devices to transmit a reference signal. The instructions may include messages indicating the specific resources or may indicate a set of resources that can be used by the devices for reference signals. In situations where the eNB explores the possibility of reusing communication resources, the reference signal transmission instructions are sent to multiple UE devices and specify the same time and frequency. For example, a cellular UE, one UE device from a first D2D pair and another UE device from a second D2D pair may be instructed to transmit reference signal at the same time and frequency. Where communication resource reuse in not contemplated, orthogonal communication resources for reference signal transmission are assigned to the different UE devices.

At step 704, the eNB receives reference signals transmitted from UE devices. The eNB receives at least reference signals from cellular UE devices to facilitate cellular uplink channel management. Where D2D UE devices transmit reference signals, the eNB may also receive the D2D UE devices reference signals.

At step 706, the eNB determines the level of interference at the eNB due to D2D reference signals. Where D2D reference signals are transmitted at the same time and frequency as cellular reference signals, the eNB determines the level of interference. The level of interference is used to determine whether communication resources and be used for cellular and D2D communication for the UE devices transmitting the reference signals.

At step 708, the eNB receives the D2D channel characteristic information from the D2D UE devices receiving the D2D reference signals. In some situations, the D2D channel characteristic information includes interference level information. For example, where UE devices transmit reference signals at the same time and frequency, the reference signals may be received at other D2D UE devices and a level of interference may be determined and reported.

At step 710, the eNB determines the D2D transmission parameters based on the reference signals (interference level) and the D2D channel characteristic information. The eNB determines where communication resources can be reused for D2D UE devices based in interference levels. The eNB also determines the appropriate transmission parameters that may include any combination of coding, modulation, transmission power, time/frequency resources and MIMO parameters. Other parameters may be included.

At step 712, the D2D transmission parameters are assigned to the D2D UE devices. The parameters may be assigned using PDCCH/PDSCH.

Figure 8:
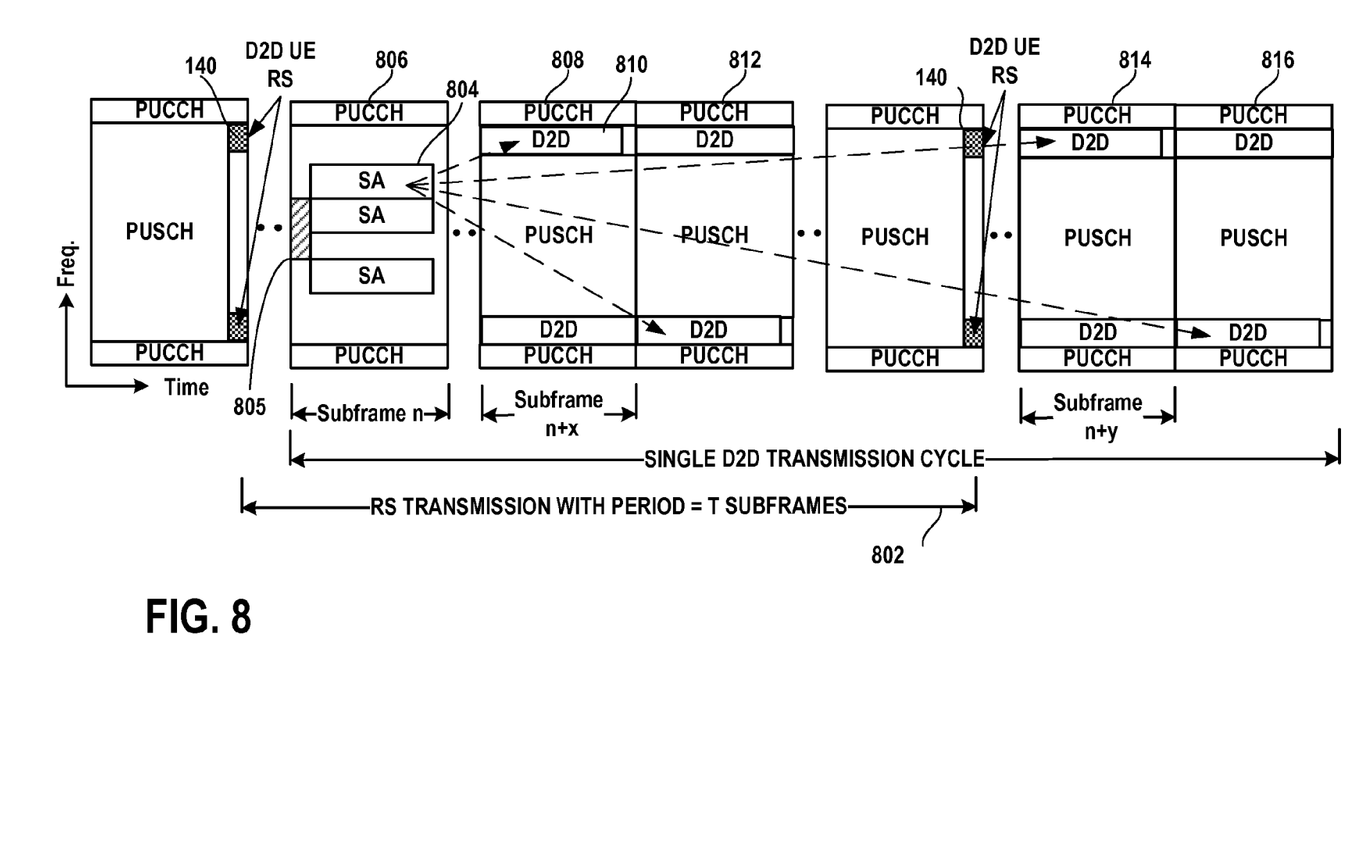
FIG. 8 is an illustration of an example of a transmission by a D2D UE device including reference signals.

FIG. 8 is an illustration of an example of a transmission by a D2D UE device including reference signals. The eNB configures the D2D UE device to transmit a reference signal 140. The transmission in the cellular uplink communication band in accordance with one or more revisions of the 3GPP LTE specification, although the cellular downlink band may be used in some situations. For the example of FIG. 8, the eNB configures the D2D UE device to transmit the reference signal in fixed frequency bands used for D2D transmission. Where multiple D2D UE devices are configured and interference is not determined, the eNB configures the D2D UE devices to transmit reference signal on orthogonal resources.

For the example, the reference signal 140 transmitted at a period of T subframes 802. After transmitting the reference signal, the UE device receives the D2D transmission parameters from the eNB and transmits a scheduling assignment 804 in subframe n 806. The scheduling assignment (SA) 804 indicates the D2D communication resources that will be used for D2D transmission in subsequent subframes. For the example, the SA 804 identifies D2D communication resources in four subframes 808, 812, 814, 816 that should be used for D2D transmissions. In the subframe n+x 808, the UE device transmits a D2D transmission 810. The UE devices also transmits data in the subframe n+x+1 812, the subframe n+y 814 and the subframe n+y+1 816.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   instructing a first user equipment (UE) device to transmit a reference signal;
   receiving, from a second UE device, device-to-device (D2D) channel characteristic information indicative of a D2D communication link between the first UE device and the second UE device, the D2D channel characteristic information determined from a UE device received reference signal that is the reference signal transmitted by the first UE device as received at the second UE device;
   determining, from the D2D channel characteristic information, D2D transmission parameters for transmitting a D2D signal from the first UE device to the second UE device; and
   transmitting the D2D transmission parameters to the first UE device.

2. The method of claim 1, wherein the D2D channel characteristic information is based on a plurality of UE device received reference signals received at the second UE device at different times.

3. The method of claim 2, wherein the receiving the D2D channel characteristic information comprises receiving the D2D channel characteristic information in a plurality of messages transmitted from the second UE device at different times.

4. The method of claim 1, further comprising:
   sending, to the second UE device, reference signal information at least partially characterizing the reference signal.

5. The method of claim 1, wherein the instructing the first UE device comprises identifying a set of communication resources allocated for transmission of the reference signal, the reference signal transmitted using selected communication resources selected by the first UE device.

6. The method of claim 5, further comprising:
sending, to the second UE device, reference signal information at least partially characterizing the reference signal wherein the reference signal information includes at least one of a UE identification code assigned to the first UE device, hopping pattern used for reference signal transmission by the first UE device, a reference signal code, and the set of communication resources.

7. The method of claim 1, further comprising:
instructing a third UE device to transmit another reference signal at the same time and using a communication resource assigned to the first UE device for transmitting the reference signal;
determining a level of interference between the another reference signal and the reference signal transmitted by the first UE device; and
allocating, based on the level of interference, communication resources to the first UE device and to the third UE device.

8. The method of claim 7, wherein the same communication resources are allocated to the first UE device and the third UE device when the level of interference is below a threshold.

9. The method of claim 8, wherein the allocating comprises allocating D2D communication resources to the first UE device for D2D communication and allocating cellular communication resources to the third UE device for cellular communication.

10. The method of claim 8, wherein the allocating comprises allocating D2D communication resources to the first UE device for D2D communication and to the third UE device for D2D communication.

11. A base station comprising:
a transmitter configured to transmit a reference signal transmission instruction message instructing a first user equipment (UE) device to transmit a reference signal;
a receiver configured to receive, from a second UE device, device-to-device (D2D) channel characteristic information indicative of a D2D communication link between the first UE device and the second UE device, the D2D channel characteristic information determined from a UE device received reference signal that is the reference signal transmitted by the first UE device as received at the second UE device; and
a controller configured to determine, from the D2D channel characteristic information, D2D transmission parameters for transmitting a D2D signal from the first UE device to the second UE device, the transmitter configured to transmit the D2D transmission parameters to the first UE device.

12. The base station of claim 11, wherein the D2D channel characteristic information is based on a plurality of UE device received reference signals received at the second UE device at different times.

13. The base station of claim 12, wherein the receiver is configured to receive the D2D channel characteristic information by receiving the D2D channel characteristic information in a plurality of messages transmitted from the second UE device at different times.

14. The base station of claim 11, wherein the transmitter is configured to send, to the second UE device, reference signal information at least partially characterizing the reference signal.

15. The base station of claim 11, wherein the reference signal transmission instruction identifies a set of communication resources allocated for transmission of the reference signal, the reference signal transmitted using selected communication resources selected by the first UE device.

16. The base station of claim 15, wherein the transmitter is further configured to transmit, to the second UE device, reference signal information at least partially characterizing the reference signal wherein the reference signal information includes at least one of a UE identification code assigned to the first UE device, hopping pattern used for reference signal transmission by the first UE device, a reference signal code, and the set of communication resources.

17. The base station of claim 11, wherein the transmitter is further configured to transmit another reference signal transmission instruction to a third UE device instructing the third UE device to transmit another reference signal at the same time and using a communication resource assigned to the first UE device for transmitting the reference signal, the controller configured to determine a level of interference between the another reference signal and the reference signal transmitted by the first UE device and to allocate, based on the level of interference, communication resources to the first UE device and to the third UE device.

18. The base station of claim 17, wherein the same communication resources are allocated to the first UE device and the third UE device when the level of interference is below a threshold.

19. The base station of claim 18, wherein the controller allocates D2D communication resources to the first UE device for D2D communication and allocates cellular communication resources to the third UE device for cellular communication.

20. The base station of claim 18, wherein the controller allocates D2D communication resources to the first UE device for D2D communication and to the third UE device for D2D communication.

* * * * *